(12) United States Patent
Montero

(10) Patent No.: US 8,037,153 B2
(45) Date of Patent: Oct. 11, 2011

(54) DYNAMIC PARTITIONING OF MESSAGING SYSTEM TOPICS

(75) Inventor: Gabriel Garcia Montero, Chapel Hill, NC (US)

(73) Assignee: International Business Machines Corporation, Armonk, NY (US)

( * ) Notice: Subject to any disclaimer, the term of this patent is extended or adjusted under 35 U.S.C. 154(b) by 1511 days.

(21) Appl. No.: 10/026,385

(22) Filed: Dec. 21, 2001

(65) Prior Publication Data

US 2003/0120720 A1    Jun. 26, 2003

(51) Int. Cl.
    *G06F 15/16* (2006.01)
(52) U.S. Cl. ............................................. 709/217; 718/1
(58) Field of Classification Search .................. 709/203, 709/217, 206, 215; 715/784; 718/104, 106, 718/1; 707/9
    See application file for complete search history.

(56) References Cited

U.S. PATENT DOCUMENTS

| | | | | |
|---|---|---|---|---|
| 6,026,396 | A * | 2/2000 | Hall .................................. | 707/4 |
| 6,065,047 | A * | 5/2000 | Carpenter et al. ............ | 709/218 |
| 6,104,989 | A * | 8/2000 | Kanevsky et al. ................ | 704/9 |
| 6,125,382 | A * | 9/2000 | Brobst et al. .................. | 718/102 |
| 6,138,120 | A * | 10/2000 | Gongwer et al. ................ | 707/10 |
| 6,236,987 | B1 * | 5/2001 | Horowitz et al. .................. | 707/3 |
| 6,490,609 | B1 * | 12/2002 | Furlani et al. .................. | 718/100 |
| 6,493,703 | B1 * | 12/2002 | Knight et al. ....................... | 707/3 |
| 6,523,022 | B1 * | 2/2003 | Hobbs .............................. | 707/3 |
| 6,542,920 | B1 * | 4/2003 | Belkin et al. ................... | 718/104 |
| 6,557,027 | B1 * | 4/2003 | Cragun ......................... | 709/204 |
| 6,584,181 | B1 * | 6/2003 | Aktas et al. ................ | 379/88.23 |

(Continued)

OTHER PUBLICATIONS

J. Wetherill, *Messaging Systems and the Java™ Message Service*, Java Developer Connection[SM], <http://developer.java.sun.com/servlet/PrintPageServlet?url=http%3A//developer.java.sun.co...>, (Sep. 21, 2001).

(Continued)

*Primary Examiner* — Douglas Blair
*Assistant Examiner* — Jason Recek
(74) *Attorney, Agent, or Firm* — Steven M. Greenberg, Esq.; Carey, Rodriguez, Greenberg & Paul

(57) ABSTRACT

A dynamic topic partitioning messaging system. The messaging system can include a message server; one or more topics stored in the message server; one or more subtopics associated with at least one of the topics in the message server; and, a dynamic topic partitioning system configured to partition the topics into the subtopics. Notably, the message server can be Java message service (JMS) compliant. In that regard, the message server can reside in a single process address space. For example, the process address space can be a Java virtual machine (JVM).

12 Claims, 3 Drawing Sheets

U.S. PATENT DOCUMENTS

| | | | | |
|---|---|---|---|---|
| 6,675,261 | B2* | 1/2004 | Shandony | 711/121 |
| 6,684,390 | B1* | 1/2004 | Goff | 717/148 |
| 6,753,889 | B1* | 6/2004 | Najmi | 715/784 |
| 6,766,349 | B1* | 7/2004 | Belkin | 718/104 |
| 6,766,361 | B1* | 7/2004 | Venigalla | 709/217 |
| 6,785,691 | B1* | 8/2004 | Hewett et al. | 707/1 |
| 6,823,351 | B1* | 11/2004 | Flood et al. | 707/206 |
| 6,826,601 | B2* | 11/2004 | Jacobs et al. | 709/217 |
| 6,839,730 | B1* | 1/2005 | Ramabhadran | 709/201 |
| 6,851,112 | B1* | 2/2005 | Chapman | 718/1 |
| 6,854,114 | B1* | 2/2005 | Sexton et al. | 718/1 |
| 6,947,949 | B2* | 9/2005 | Fujisawa | 707/103 R |
| 7,024,455 | B2* | 4/2006 | Yokobori et al. | 709/204 |
| 7,177,922 | B1* | 2/2007 | Carter et al. | 709/223 |
| 7,200,635 | B2* | 4/2007 | Yashchin et al. | 709/206 |
| 2002/0076674 | A1* | 6/2002 | Kaplan | 434/107 |
| 2002/0141584 | A1* | 10/2002 | Razdan et al. | 380/203 |
| 2002/0198943 | A1* | 12/2002 | Zhuang et al. | 709/206 |
| 2003/0041072 | A1* | 2/2003 | Segal et al. | 707/104.1 |

OTHER PUBLICATIONS

G. S. Raj, *Java Message Service (JMS)*, <http://www.execpc.com/~gopalan/jms/jms.html>, (Sep. 24, 1999).

*Basic JMS API Concepts*, Java™ Message Service Tutorial Chapter 2, <http://java.sun.com/products/jms/tutorial/1_3-fcs/doc/basics.html>, (Dec. 10, 2001).

*The JMS API Programming Model*, Java™ Message Service Tutorial Chapter 3, <http://java.sun.com/products/jms/tutorial/1_3-fcs/doc/prog_model.html>, (Dec. 10, 2001).

* cited by examiner

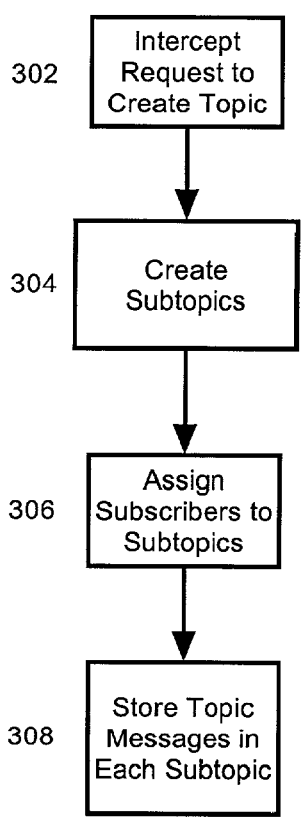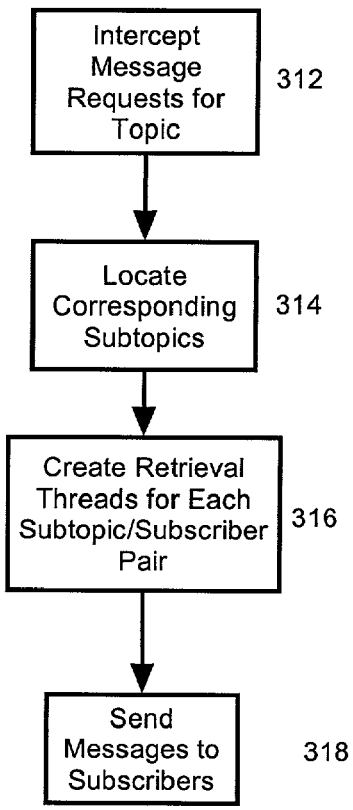
FIG. 3A                    FIG. 3B

DYNAMIC PARTITIONING OF MESSAGING SYSTEM TOPICS

BACKGROUND OF THE INVENTION

1. Statement of the Technical Field

The present invention relates to asynchronous communications and more particularly to messaging systems.

2. Description of the Related Art

Distributed applications have begun to proliferate, as have a host of previously unexplored problems associated with message synchronization, transmission reliability, system scalability, and message security. Present solutions include conventional messaging systems formed from loosely coupled components communicating with one another with asynchronous messages. Notably, conventional messaging systems have been used to build highly reliable, scalable, and flexible distributed applications.

At its core, the conventional messaging system permits separate, uncoupled applications to reliably communicate in an asynchronous manner. Importantly, the messaging system architecture generally replaces the client/server model with a peer-to-peer relationship between individual computing components, wherein each peer computing component can send and receive messages to and from other peer computing components. In consequence, messaging systems can provide several significant advantages over other, more conventional distributed computing models.

For instance, messaging systems encourage "loose coupling" between message consumers and message producers. Specifically, there exists a high degree of anonymity between producer and consumer. In fact, from the perspective of the message consumer, it does not matter who produced the message, where the producer resided in the computing network, and when the message had been produced. As a result, dynamic, reliable, and flexible systems can be assembled whereby entire ensembles of sub-applications can be modified without affecting the remaining portion of the system. In any event, conventional messaging systems assume one of two messaging systems models: publish/subscribe and point-to-point.

The publish/subscribe messaging system supports an event driven model where consumers and producers participate in the transmission of messages. Producers "publish" messages, while consumers "subscribe" to messages of interest, and consume the messages. More particularly, producers associate messages with a specific topic, and the messaging system routes messages to consumers based upon the topics for which consumers have registered. In point to point messaging systems, by comparison, messages are routed to an individual consumer which maintains a queue of "incoming" messages. Messaging applications send messages to a specified queue, and clients retrieve messages from a queue.

The Java™ Message Service (JMS), part of the Java 2 Enterprise Edition (J2EE™) suite manufactured by Sun Microsystems of Palo Alto, Calif., provides standard APIs that Java developers can use to access the common features of enterprise messaging systems. JMS supports both the publish/subscribe and point-to-point models and allows the creation of message types consisting of arbitrary Java objects. A fundamental design goal of JMS is to provide a consistent set of interfaces that messaging system clients can use independent of the underlying message system provider. In this way, not only are client applications portable across machine architectures and operating systems, but the client applications also remain portable across messaging products.

Still, in JMS only a single thread can be used to service a messaging system subscriber receiving any published message for a customer defined topic in which it is interested. In consequence, if enough message traffic is generated for that topic, a single thread in a multithreaded virtual machine can become overrun fairly quickly. Accordingly, what is needed is a messaging system in which multiple threads can service a messaging system subscriber receiving any published message for a customer defined topic.

SUMMARY OF THE INVENTION

The present invention is a messaging system which overcomes the single threaded deficiencies of the prior art and provides a novel and non-obvious system and method for dynamically partitioning a message topic into one or more subtopics so that multiple threads can service publishers and subscribers of messages associated with the message topic. A messaging system which has been configured in accordance with one aspect of the present invention can include a message server; one or more topics stored in the message server; one or more subtopics associated with at least one of the topics in the message server; and, a dynamic topic partitioning system configured to partition the topics into the subtopics.

Notably, the message server can be Java message service (JMS) compliant. In that regard, the message server can reside in a single process address space. For example, the process address space can be a Java virtual machine (JVM). In consequence, the message system can include a multiplicity of threads of execution, each thread hosting a process for communicating a message between one of the subtopics in the message server and a message subscriber.

A dynamic topic partitioning system which can be used in the messaging system of the present invention can include a message interface through which message publishers can post messages to selected topics, and from which message subscribers can request messages which have been published to selected topics. A subtopic store can be included. The subtopic store can be configured to distribute messages of the selected topics within associated subtopics. Finally, the system can include a request processor in which requests to post and retrieve messages to and from individual ones of the selected topics can be converted into message system requests to respectively post and retrieve messages to and from the associated subtopics in the subtopic store. Notably, the request processor can process each of the converted message system requests in individual threads of execution.

A message system servicing method for use with a message server in a message system can include intercepting message requests for a selected topic from subscribers in the message system. The message requests can be associated with subtopics created for the selected topic. In consequence, the message requests can be services with messages in the subtopics from within separate threads of execution for each subtopic-subscriber pair.

BRIEF DESCRIPTION OF THE DRAWINGS

There are shown in the drawings embodiments which are presently preferred, it being understood, however, that the invention is not limited to the precise arrangements and instrumentalities shown, wherein:

FIG. 3A is a flow chart illustrating a process for partitioning a message topic into subtopics during topic creation; and, FIG. 3B is a flow chart illustrating a process for distributing messages which have been partitioned into the subtopics of FIG. 3A during message subscription.

DETAILED DESCRIPTION OF THE PREFERRED EMBODIMENTS

The present invention is a messaging system which allows for the creation of multiple publisher and subscriber threads for a selected topic in a publish/subscribe messaging system. In particular, in accordance with the inventive arrangements, selected message topics in a message server can be subdivided into individual subtopics on a per subscriber or per publisher basis. Subsequently, requests to subscribe to messages from the selected message topic can be intercepted and associated with a suitable one of the subtopics in a separate thread. In this way, subscriber threads can be established on a subtopic basis rather than a complete topic basis. Hence, message traffic overruns can be avoided an enhanced scalability provided for in the messaging system.

Figure 1:
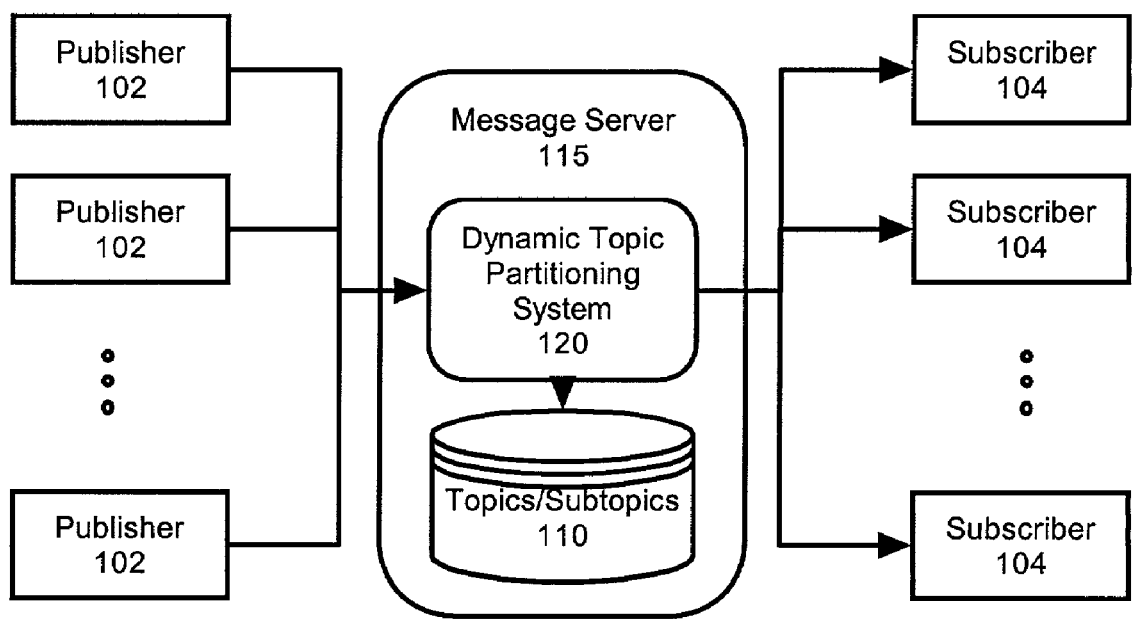
FIG. 1 is an schematic illustration of a messaging system which has been configured according to the inventive arrangements.

FIG. 1 is a schematic illustration of a messaging system which has been configured according to the inventive arrangements. The messaging system can include one or more publishers 102 and one or more subscribers 104. Each publisher 102 can post messages to a selected topic in a message server 115 in the messaging system. Conversely, each subscriber 104 can receive messages from the message server 115 based upon those message topics for which the subscribers 104 have subscribed. Notably, unlike a conventional messaging system, in the messaging system of the present invention, a dynamic topic partitioning system 120 can be provided.

The dynamic topic partitioning system 120 can transparently intercept requests from publishers 102 to post messages to a selected topic in fixed storage 110 in the message server 115. Specifically, as only a single thread can be allocated per subscriber per topic in a conventional messaging system, in the present invention, the dynamic topic partitioning system 120 can partition the selected topic into one or more subtopics in fixed storage 110. Additionally, the dynamic topic partitioning system 120 can distributed messages for the selected topic to individual ones of the subtopics. In consequence, when a subscriber 104 retrieves messages from the selected topic, multiple threads can be used to retrieve the messages.

Figure 2:
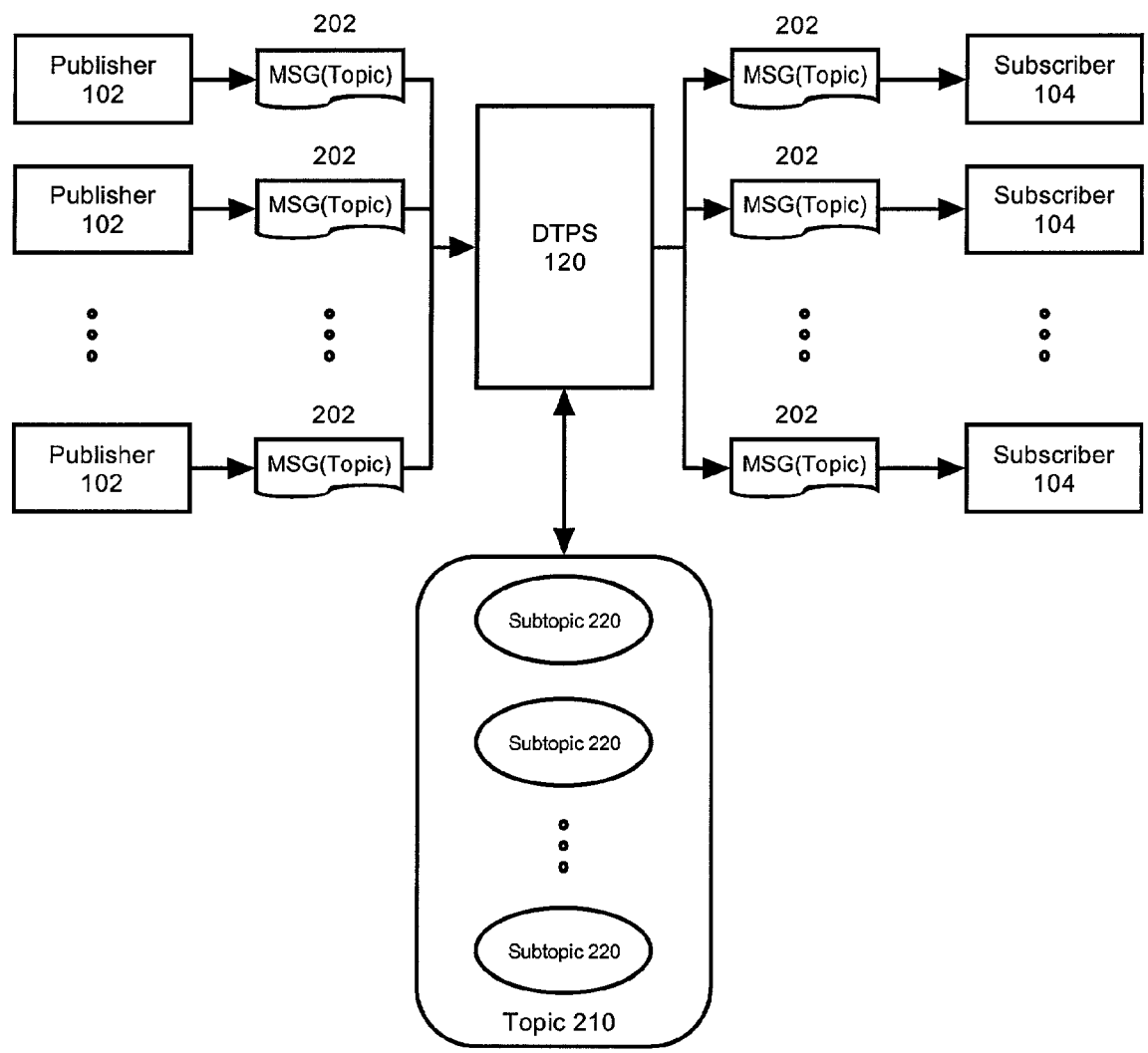
FIG. 2 is a block illustration of a dynamic messaging partitioning process for use in the messaging system of FIG. 1.

FIG. 2 is a block illustration of a dynamic messaging partitioning process for use in the messaging system of FIG. 1. Typically, topics are created during the initialization of the messaging system. Hence, during initialization each attempt to create a topic 210 can be intercepted by the dynamic topic partitioning system 120. Specifically, upon intercepting a request to create a topic 210, the dynamic topic partitioning system 120 can create one or more subtopics 220 and can assign selected subscribers 104 to the subtopics 220. Notwithstanding, the invention is not limited in this regard and the topics 210 can be subdivided into subtopics 220 dynamically subsequent to initialization.

In any case, when a publisher 102 posts a message 202 to the topic 210, the message 202 can be posted in a selected one of the subtopics 220 programmatically. That is, each message 202 posted to the topic 210 can be intercepted by the dynamic topic partitioning system 120 and assigned to a particular subtopic 220, based on a distribution algorithm, such as randomly selecting one of the subtopics 220 to which the message 202 can be posted. Still, the invention is not limited in regard to the method by which messages 202 are distributed to particular subtopics 220.

Importantly, individual ones of the subscribers 104 can retrieve messages 202 posted to the selected topic 210 in the messaging system. Each attempt to retrieve a message 202, however, can be intercepted by the dynamic topic partitioning system 120. More particularly, upon intercepting a message 202, the dynamic topic partitioning system 120 can determine whether a subtopic 220 has been created for the particular subscriber 104 to the selected topic 210. If a subtopic 220 has been created, the message 202 can be retrieved therefrom within its own thread. Otherwise, the message can be retrieved directly from the selected topic 210 using a single thread. By partitioning the selected topic 210 into multiple subtopics 220, however, multiple individual threads can be allocated for each subscriber 104 retrieving messages 202 from the selected topic 210.

FIG. 3A is a flow chart illustrating a process for partitioning a message topic into subtopics during topic creation. Beginning in step 302, a request to create a topic can be intercepted. In step 304, the topic can be subdivided into multiple subtopics. The number of subtopics created can vary, for example, according to either a pre-specified number, or a number proportional to an anticipated number messages posted to the topic during a given time interval. In any case, in step 306, subscribers can be assigned to the topic. Finally, in step 308, subsequently posted messages to the topic can be distributed among the subtopics according to a distribution formula, for instance in wrap-around sequential order.

FIG. 3B is a flow chart illustrating a process for distributing messages which have been partitioned into the subtopics of FIG. 3A during message subscription. Beginning in step 312, a request for messages from a topic can be received from a subscriber. In block 314, subtopics for the topic can be located and in block 316, individual retrieval threads can be established with the subscriber for each subtopic. In block 318, the messages in each subtopic can be forwarded to the subscriber. Thus, multiple threads can be used to distribute messages to a subscriber from within a single topic.

The present invention can be realized in hardware, software, or a combination of hardware and software. An implementation of the method and system of the present invention can be realized in a centralized fashion in one computer system, or in a distributed fashion where different elements are spread across several interconnected computer systems. Any kind of computer system, or other apparatus adapted for carrying out the methods described herein, is suited to perform the functions described herein.

A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which, when loaded in a computer system is able to carry out these methods.

Computer program or application in the present context means any expression, in any language, code or notation, of a set of instructions intended to cause a system having an information processing capability to perform a particular function either directly or after either or both of the following a) conversion to another language, code or notation; b) reproduction in a different material form. Significantly, this invention can be embodied in other specific forms without departing from the spirit or essential attributes thereof, and accordingly, reference should be had to the following claims, rather than to the foregoing specification, as indicating the scope of the invention.

I claim:

1. A message system servicing method performed within a message server, comprising:
   receiving, from a message publisher, a request to create a topic;
   subdividing the topic into a plurality of subtopics;
   storing, within separate ones of the plurality of subtopics, messages posted to the topic;
   receiving, from a message subscriber, a request to retrieve messages from the topic;
   upon determining that the messages exist, for the requested topic, within the separate ones of the plurality of subtopics, creating a separate retrieval thread of execution for each specific subtopic and subscriber pair; and
   retrieving the messages, from within the separates ones of the plurality of subtopics, respectively using the separate retrieval thread of execution for each subtopic and subscriber pair.

2. The method of claim 1, wherein said message server is Java message service (JMS) compliant.

3. The method of claim 1, wherein said message server resides in at least one process address space.

4. The method of claim 3, wherein said at least one process address space is a Java virtual machine.

5. A messaging computer system comprising:
   a message server;
   fixed storage configured to store
      a plurality of topics, and
      a plurality of subtopics associated with one of said topics; and
   a dynamic topic partitioning system configured to
      receive, from a message publisher, a request to create the one of said topics;
      subdivide the one of said topics into the plurality of subtopics;
      store, within separate ones of the plurality of subtopics, messages posted to the one of said topics;
      receiving, from a message subscriber, a request to retrieve messages from the one of said topics;
      upon determining that the messages exist, for the requested one of said topics, within the separate ones of the plurality of subtopics, creating a separate retrieval thread of execution for each specific subtopic and subscriber pair; and
      retrieving the messages, from within the separate ones of the plurality of subtopics, respectively using the separate retrieval thread of execution for each specific subtopic and subscriber pair.

6. The messaging computer system of claim 5, wherein said message server is Java message service (JMS) compliant.

7. The messaging computer system of claim 5, wherein said message server resides in at least one process address space.

8. The messaging computer system of claim 7, wherein said at least one process address space is a Java virtual machine.

9. A computer-readable storage device having stored thereon a computer program for performing message system servicing, said computer program comprising a routine set of instructions, which when executed by a messaging computer system, causing the message computer system to perform:
   receiving, from a message publisher, a request to create a topic;
   subdividing the topic into a plurality of subtopics;
   storing, within separate ones of the plurality of subtopics, messages posted to the topic;
   receiving, from a message subscriber, a request to retrieve messages from the topic;
   upon determining that the messages exist, for the requested topic, within the separate ones of the plurality of subtopics, creating a separate retrieval thread of execution for each specific subtopic and subscriber pair; and
   retrieving the messages, from within the separates ones of the plurality of subtopics, respectively using the separate retrieval thread of execution for each specific subtopic and subscriber pair.

10. The computer-readable storage device of claim 9, wherein
    said message server is Java message service (JMS) compliant.

11. The computer-readable storage device of claim 9, wherein
    said message server resides in at least one process address space.

12. The computer-readable storage device of claim 11, wherein
    said at least one process address space is a Java virtual machine.

* * * * *